United States Patent [19]
Johnson

[11] Patent Number: 6,015,134
[45] Date of Patent: Jan. 18, 2000

[54] PNEUMATIC ACTUATOR ASSEMBLY

[75] Inventor: Clarence William Johnson, Calgary, Canada

[73] Assignee: Barber Industries Inc., Calgary, Canada

[21] Appl. No.: 08/082,579

[22] Filed: Jun. 28, 1993

[51] Int. Cl.[7] .............. F16K 31/126; F16K 31/122; F16K 37/00
[52] U.S. Cl. .................. 251/61.4; 251/63.4; 251/63.5; 251/63.6; 251/291; 403/378; 137/556
[58] Field of Search ................ 251/61.2, 61.3, 251/61.4, 61.5, 63.5, 63.6, 291, 292, 63.4; 137/553, 556; 403/378, 379.5; 92/130 A, 130 B, 130 D

[56] References Cited

U.S. PATENT DOCUMENTS

| | | | |
|---|---|---|---|
| Re. 20,092 | 9/1936 | Mason | 251/61.4 |
| 1,805,392 | 5/1931 | Douds | 251/88 |
| 2,464,381 | 3/1949 | Donaldson et al. | 403/379 |
| 2,577,434 | 12/1951 | Rosenbaum | 251/291 |
| 3,151,511 | 10/1964 | Brase | 403/379 |
| 3,175,473 | 3/1965 | Boteler et al. | 251/61.5 |
| 3,379,405 | 4/1968 | Natho | 251/63.6 |
| 3,410,304 | 11/1968 | Paul, Jr. | 251/63.5 |
| 3,789,875 | 2/1974 | McGee | 251/63.6 |
| 3,913,883 | 10/1975 | Irwin | 251/63.6 |
| 3,945,302 | 3/1976 | Downs | 251/61.4 |
| 3,958,592 | 5/1976 | Wells et al. | 251/63.6 |
| 4,354,425 | 10/1982 | Bruton et al. | 92/94 |
| 4,423,748 | 1/1984 | Ellett | 251/63.6 |
| 4,436,279 | 3/1984 | Bonds et al. | 251/63.6 |
| 4,445,424 | 5/1984 | Foster | 251/63.6 |
| 4,547,101 | 10/1985 | Dowdakin, Sr. | 403/378 |
| 4,585,207 | 4/1986 | Shelton | 251/63.6 |
| 4,651,970 | 3/1987 | Sadler | 92/130 A |
| 4,699,354 | 10/1987 | Gibson et al. | 251/61.5 |
| 4,744,386 | 5/1988 | Frazer | 251/63.6 |
| 4,934,652 | 6/1990 | Golden | 251/63.6 |
| 4,967,785 | 11/1990 | Young | 251/63.6 |
| 5,052,430 | 10/1991 | Trantwein | 251/291 |
| 5,070,900 | 12/1991 | Johnson | 137/485 |
| 5,172,719 | 12/1992 | Dawawala et al. | 251/63.6 |

FOREIGN PATENT DOCUMENTS

| | | | |
|---|---|---|---|
| 1119073 | 12/1961 | Germany | 251/61.4 |
| 1196919 | 7/1965 | Germany | 251/61.4 |
| 812434 | 4/1959 | United Kingdom | 251/61.4 |

OTHER PUBLICATIONS

Copies from trade journals of five (5) actuators as follows: 1/5 Otis; 2/5 Axelson, Inc.; 3/5 Baker Oil Tool; 4/5 W–K–M; 5/5 Barber Ltd. (the Applicant) (Dates Unknown).

Primary Examiner—George L. Walton
Attorney, Agent, or Firm—John Russell Uren

[57] ABSTRACT

An actuator used to close and open a shut-in valve of a flowline. An indicator rod is threadedly connected to a connector which, in turn, is threadedly connected to the valve stem of the shut-in valve. A compression spring extends between a diaphragm plate and the bottom of the actuator. The shut-in valve is opened by pneumatic pressure above the diaphragm and the compression spring closes the shut-in valve by moving the valve stem when the pneumatic pressure above the diaphragm is exhausted to the atmosphere. The actuator including the compression spring may be disconnected from the bonnet on which the actuator is attached by rotating the indicator rod and removing the attachment bolts between the actuator and the attachment flange. The connector will be left on the valve stem.

18 Claims, 5 Drawing Sheets

PNEUMATIC ACTUATOR ASSEMBLY

INTRODUCTION

This invention relates to a valve actuator and, more particularly, to a pneumatic valve actuator which is used to maintain a gate valve in a flowline in an open position and to close the gate valve under certain conditions.

BACKGROUND OF THE INVENTION

Pneumatic valve actuators to open and close gate valves for allowing or prohibiting flow in a flowline are well known. Generally, such actuators are operated by applying a pneumatic force to a diaphragm which diaphragm acts on a valve stem to maintain the gate valve in an open position so as to allow fluid or gas to pass therethrough. Under conditions such as emergency conditions where leaks from the flowline may occur or if the fluid input to the flowline exceeds its output, the air holding the actuator in the open position is exhausted from the actuator and a preloaded compression spring forces the valve stem of the actuator to move so that as to close the valve in a fail-safe type configuration.

Pneumatic valve actuators of the type referred to, however, suffer from disadvantages. One disadvantage lies in the removal of the actuator from the attachment flange to which the actuator is connected. In previous actuators and in order to repair the actuator, the actuator had to be removed from the valve stem of the shut-in valve. In many instances, it could not be so removed unless the shut-in valve was disassembled and the flow through the flowline terminated.

SUMMARY OF THE INVENTION

According to one aspect of the invention, there is provided a pneumatic actuator assembly comprising an actuator housing, means for connecting said actuator housing to the bonnet structure of a valve, a diaphragm movable within said actuator housing under the influence of pressurized air or gas and a compression spring, the position of said diaphragm extending between a first position under the influence of said pressurized air closer to said bonnet structure and a second position under the influence of said compression spring further from said bonnet structure, said compression spring being mounted within said housing and acting in a direction opposed to the direction of said pressurized air on said diaphragm, an indicator rod removably attached to a connector and extending through the top of said actuator housing, said connector being located below said diaphragm and being operable to be attached to a valve stem extending through said bonnet structure.

According to a further aspect of the invention, there is provided a connector for an actuator assembly, said connector being removable from and axially adjustable relative to the valve stem of a shut-in valve, said connector having a first hole in the bottom of said connector for attachment to said valve stem, at least one hole extending radially through said connector between said bottom and the top of said connector and an axially extending second hole in the top of said connector.

According to yet a further aspect of the invention, there is provided a hydraulic actuator comprising a housing, a cylinder in said housing, a rod within said cylinder and being connected to a valve stem, a compression spring acting between said cylinder and said housing and a second spring acting between said cylinder and said valve stem to create a predetermined force between said cylinder and said valve stem.

BRIEF DESCRIPTION OF THE SEVERAL VIEWS OF THE DRAWINGS

A specific embodiment of the invention will now be described, by way of example only, with the use of drawings in which.

DESCRIPTION OF SPECIFIC EMBODIMENT

Figure 1:
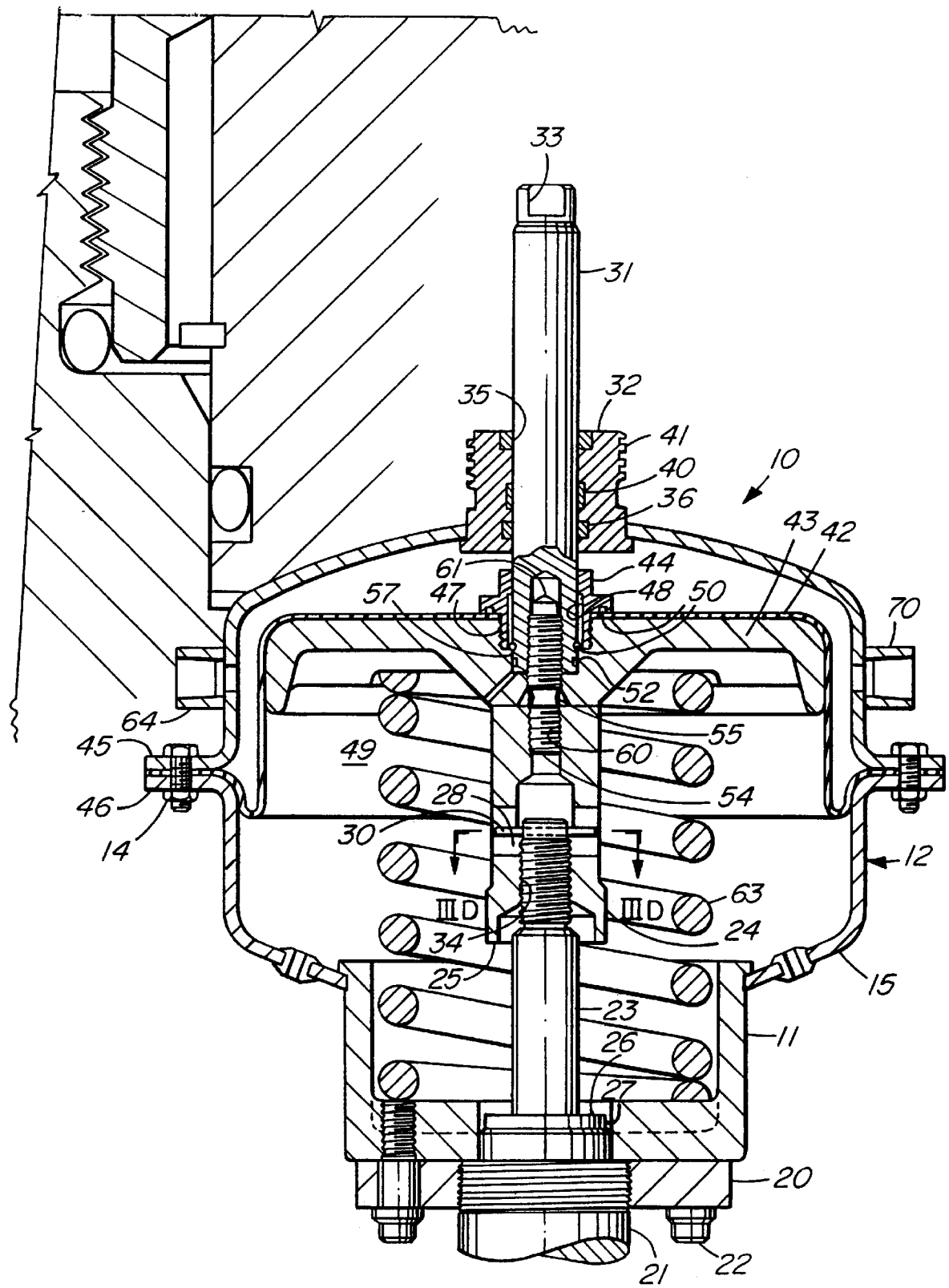
FIG. 1 is a cutaway diagrammatic sectional view of the actuator according to the invention.

Referring now to the drawings and, in particular, to FIG. 1, a pneumatic actuator according to the invention is generally illustrated at 10. The actuator includes a lower or bottom housing 11 and an upper housing generally shown at 12 which includes an upper diaphragm case 13 and a lower diaphragm case 15. The upper diaphragm case 13 is connected to the lower diaphragm case 15 by a plurality of bolted connections 14 extending around the circumference of the upper housing 12 of the actuator 10.

The actuator 10 is connected to an attachment flange 20 by attachment bolts 22. The flange 20 is threadedly mounted to a bonnet structure 21 connected to a shut-in valve (not illustrated).

A valve stem 23 extends from the shut-in valve through the bonnet structure 21 and into the actuator 10. A connector 24 is threadedly mounted onto valve stem 23 and is adjusted relative to the valve stem 23 by rotation on threads 34 such that when the shut-in valve is fully open in the down position so as to allow full flow, the lower end 25 of connector 24 is in contact with the upper end 26 of the packing retainer 27.

Once correctly adjusted relative to the stem 23, a locking pin 30 (FIG. 3D) is inserted through a pair of opposed slots 28 in connector 24 (FIG. 3B) and one of the holes 29 (FIG. 4) in stem 23. The slots 28 and holes 29 are configured so as to allow minimal adjustment of the connector 24 relative to the valve stem 23 when the correct position for connector 24 has been reached while the slots 28 are proportioned to permit sufficient rotation of the connector 24 relative to the threads 34 of stem 23 to accommodate the slight rotation that occurs when spring 63 is compressed or allowed to expand axially.

Figure 3A:
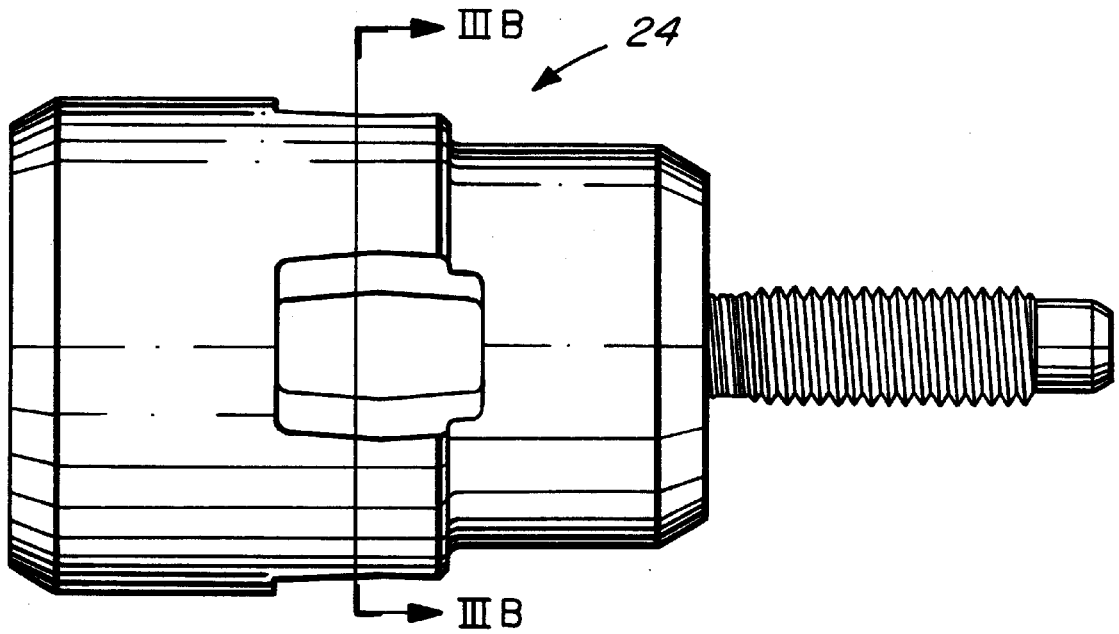
FIG. 3A is a side view of the connector used in the actuator of FIGS. 1 and 2 with a threaded stud attached.
Figure 3B:
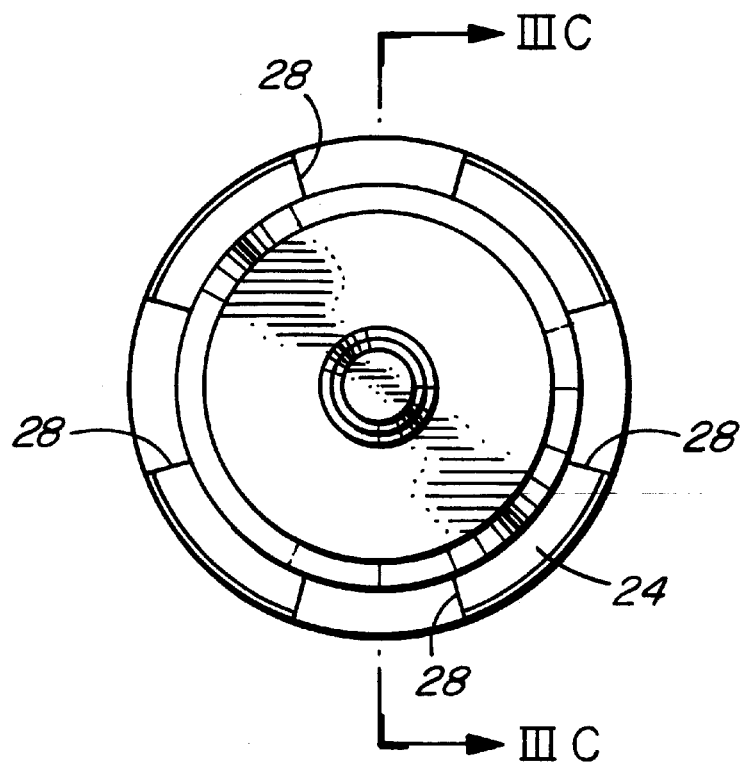
FIG. 3B is a sectional view of the connector of FIG. 3A taken along IIIB—IIIB of FIG. 3A.
Figure 3C:
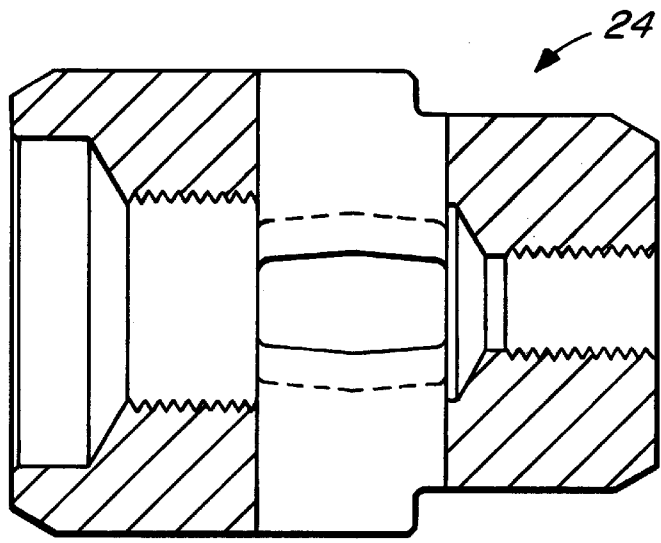
FIG. 3C is a cross-sectional view taken along IIIC—IIIC of FIG. 3B.
Figure 3D:
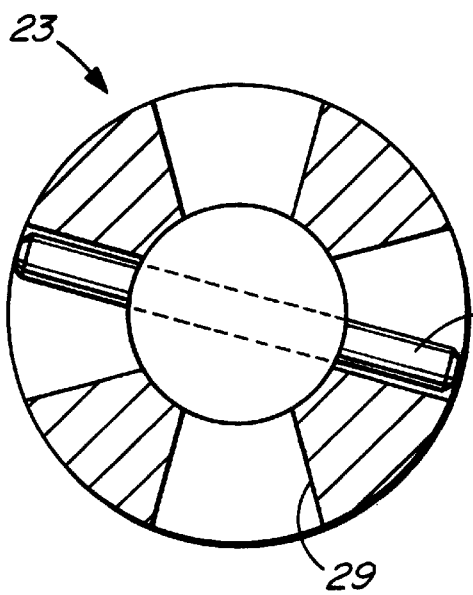
FIG. 3D is a plan view of the pin extending through the valve stem.
Figure 4:
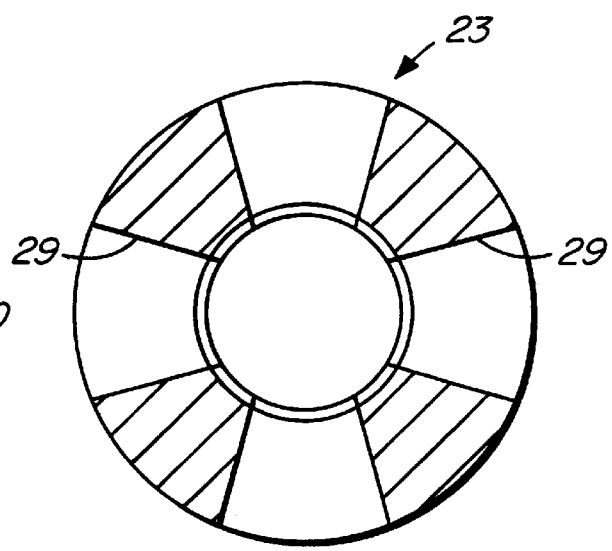
FIG. 4 is a view taken along IV—IV of FIG. 1.

Conveniently, four (4) slots 28 located at 90° to each other as illustrated in FIG. 3B are provided in the connector 24 and two holes 29 located 45° to each other in stem 23 as seen in FIG. 4 are provided. This permits installation of the pin 30 by rotation of the connector 24 not more than $\frac{1}{16}$ of a turn from the optimum adjusted position of the connector 24.

An indicator rod 31 slidably extends through a boss 32 which is integral with upper diaphragm case 13. The indicator rod 31 has a set of wrench flats 33 in its upper end and a threaded hole 62 in the bottom end. The wrench flats 33 are used to rotate the indicator rod 31 in assembly and disassembly operations.

The boss 32 has a wiper 35 located in the upper end and a seal 36 located in the lower area. A guide ring 40 is mounted in the boss 32 which acts as a guide on indicator rod 31 when it moves longitudinally within boss 32. Boss 32 has a lock out thread 41 machined on its circumference as illustrated.

Figure 2:
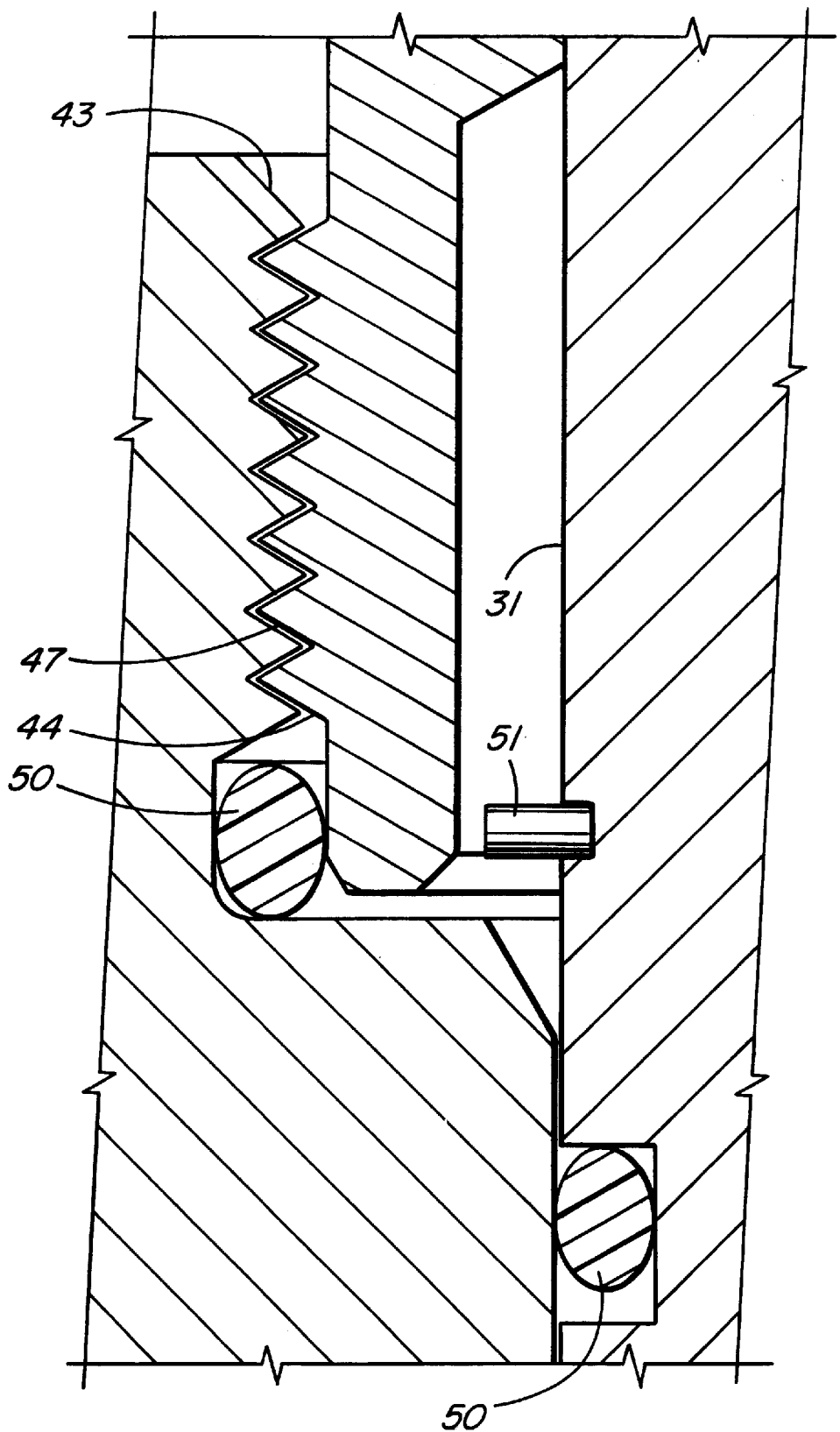
FIG. 2 is an enlarged view particularly showing the indicator rod, the nut and the diaphragm plate of the actuator of FIG. 1.

A diaphragm 42 is mounted within the actuator 10 and is clamped between the flanges 45, 46 of the upper and lower diaphragm cases 13, 15, respectively. A diaphragm plate 43 is mounted below the diaphragm 42 and moves with and provides support to the diaphragm 42. The diaphragm plate 43 includes a safety vent passageway 49 which is provided for safety purposes as will be described. A nut 44 is connected to the diaphragm plate 43 by threads 47 as best seen in FIG. 2. A pair of seals 50 act between the nut 44 and the diaphragm 42 and diaphragm plate 43. The nut 44 also has an inside circumferential cavity 48 which allows movement of the retaining ring 51 on indicator rod 31 within the cavity 48. A further o-ring 52 is mounted between the indicator rod 31 and the diaphragm plate 43.

A stud 53 has threaded connections at both ends. One end 54 of stud 53 is threadedly inserted into a hole 60 in connector 24. The opposite end 61 of stud 53 is threadedly mounted in a hole 62 in indicator rod 31. The bottom four (4) threads of stud 53 are secured in the top of connector 24 with LOCTITE adhesive.

A compression spring 63 is mounted within the actuator 10 between the diaphragm plate 43 and the bottom inside of lower housing 11. An air or gas inlet connection 64 is mounted to the upper diaphragm case 13 to allow entry of air or gas and outlet connection 70 is mounted on the opposite side of the upper diaphragm case 13 to allow the exit of air or gas.

OPERATION

To assemble the actuator 10, the valve stem 23 will be located so that the shut-in valve is in its fully open lower position. The connector 24 is threadedly mounted on the valve stem 23 and rotated so as to move downwardly relative to the valve stem 23 until the bottom end 25 contacts the top of packing retainer 27. Pin 30 is then inserted through the holes 29 in stem 23 by rotating the connector 24 an amount sufficient to insert the pin 30 through the slots 28 and holes 29 with minimal rotation of the connector 24 from the optimum position.

The actuator housing 12 which contains compression spring 63, diaphragm plate 43, diaphragm 42, nut 44 and indicator rod 31 is then mounted on the attachment flange 20 and the attachment bolts 22 are connected. In this position, the nut 44 will be in contact with boss 32 under the influence of compression spring 63 and the stud 53 will extend vertically from connector 24.

The valve stem 23 will be in a raised position with a shoulder (not illustrated) on the valve stem 23 establishing the fully up closed position. The indicator rod 31 will be lowered until it contacts stud 53 and it will then be rotated on the threads in hole 62 moving the diaphragm plate 43, diaphragm 42 and nut 44 downwardly until the bottom of the diaphragm plate 43 contacts connector 24. At this point, uppermost position for the diaphragm 42 and diaphragm plate 43 will be established and the top of nut 44 will be in a position below boss 32 as is illustrated in FIG. 1.

It will now be assumed that it is desired to open the shut-in valve and to allow flow within the flowline to resume.

A gas, conveniently air, will be supplied to the inlet 64 and outlet 70 will be closed by way of a valve or otherwise. The pressure of the air will act across the top area of diaphragm 42 in a downwardly direction and the resulting force will push diaphragm 42 and diaphragm plate 43 downwardly against the force exerted by the compression spring 63 thereby moving valve stem 23 downwardly until the bottom 25 of connector 24 contacts the upper end of the packing retainer 27. In this position, the shut-in valve will be in the fully open position and flow through the flow line is permitted.

If it is desired to close the shut-in valve for emergency purposes or otherwise, the gas in the actuator housing 13 which is acting on the diaphragm 42 will immediately be allowed to escape from outlet 70. Compression spring 63 will thereby act upwardly on the diaphragm plate 43 moving the valve stem 23 upwardly until the shoulder on valve stem 23 stops further movement of the valve stem 23 upwardly. The shut-in valve will close and terminate flow in the flowline.

In the event it is desired to remove the actuator 10 from the flange 20 for servicing purposes or otherwise, the air or gas in the actuator housing 13 will be exhausted to atmosphere such that the compression spring 63 moves the diaphragm plate 43 upwardly until the shoulder on valve stem 23 stops movement of the valve stem 23. The indicator rod 31 will be rotated by using a tool on the wrench flats 33 which will permit diaphragm plate 43 and nut 44 to rise until nut 44 contacts boss 32. Rotation of the indicator rod 31 will continue until the indicator rod 31 is threaded off stud 53. The attachment bolts 22 are removed and the entire actuator 10 may be removed from the attachment flange 20 with the shut-in valve closed, leaving behind valve stem 23, connector 24 and stud 53.

In the event a workman inadvertently attempts to remove the indicator rod 31 from stud 53 when the actuator 10 is under pressure and the shut-in valve is in the open position, there is a potential for damage. This potential is reduced by the provision of safety vent 45 in diaphragm plate 43. When the indicator rod 31 is removed from stud 53 while the diaphragm 42 is under pressure, air will slowly escape from the volume above the diaphragm 42 to the lower cavity of the actuator through the vent 45 when the indicator rod 31 is threaded off stud 53 thereby allowing a convenient and much slower upwardly movement of the diaphragm 42 and the nut 44 towards boss 32.

It will be noted that the connector 24 may be of different sizes thereby allowing the same actuator 10 to be used with shut-in valves of different sizes and thereby offering increased flexibility. For example, the actuator 10 may be used with 2", 2½" and 3" shut-in valves by using connectors 24 of different lengths.

Figure 5:
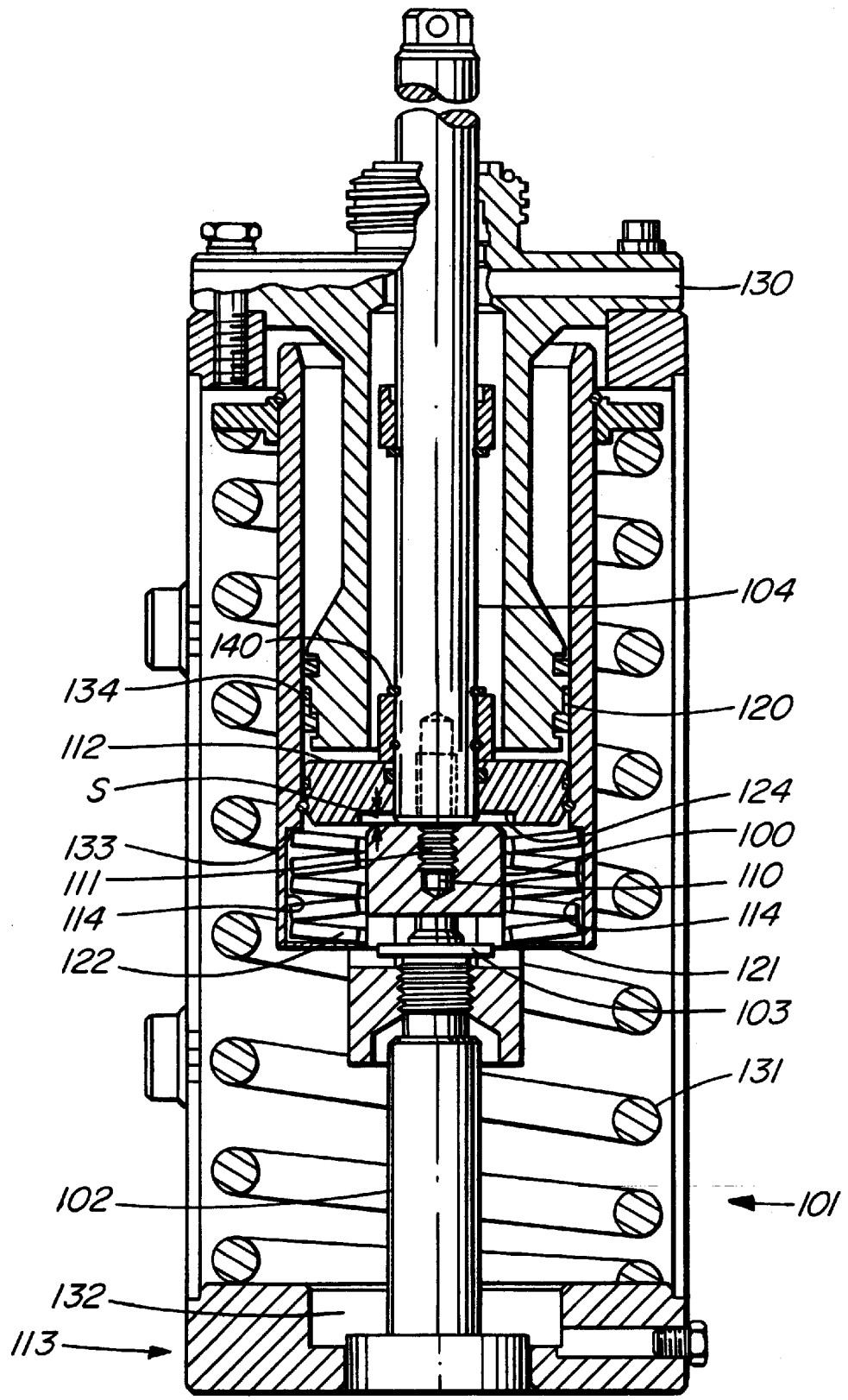
FIG. 5 is a partially sectional view of a hydraulic actuator illustrating the connector and a cavity allowing relative movement between the connector and the actuator cylinder so as to accommodate volume changes in the hydraulic fluid caused by ambient temperature changes.

Yet a further embodiment of the invention is illustrated in FIG. 5. In this embodiment, the connector 100 is mounted within a hydraulic actuator generally illustrated at 101 of the type similar to that described in our U.S. Pat. No. 5,070,900 issued Dec. 10, 1991.

In the embodiment of FIG. 5, the connector 100 is threaded onto valve stem 102 and maintained in position with pin 103 using precisely the same technique as was described in connection with the pneumatic actuator of FIG. 1. The indicator rod 104 is connected to the connector 100 using a stud 110 which is maintained in connector 100 using LOCTITE adhesive on the top four threads 111, again as was previously described.

As the indicator rod 104 is tightened onto stud 111, a collar 134 held in place on indicator rod 104 by retaining ring 140 will contact load plate 112 and terminate axial movement of the indicator rod 104 relative to the load plate 112. Further tightening of the indicator rod 104 will move the shoulder 123 of connector 100 into contact with a disc spring 122 which is held in position by retaining ring 121. As tightening of the indicator rod 104 continues, a preload in the disc spring 122 will take place thereby creating a predetermined force between the cylinder 120 and the connector 100 when the indicator rod 104 is fully threaded onto stud 110. In this position, there is a distance "S" between the top of the connector 100 and the bottom of the load plate 112 as defined by a circumferential cavity 124 formed in the load plate 112.

In this position, the shut-in valve (not illustrated) is in its closed position with the valve stem 102 located in its fully up position and being restrained from further upwards movement by a shoulder (not illustrated) on the valve stem 102 within the bonnet structure generally illustrated at 113.

It is desirable in the hydraulic actuator 101 to provide apparatus for accommodating the change in volume of the fluid within the actuator 101 which volume changes may be caused by ambient temperature. If, for example, the actuator 101 is installed with a higher ambient temperature such that the valve assumes a fully open position allowing uninterrupted flow through the flowline, and the temperature subsequently drops, the volume of fluid in the actuator 101 will also be reduced. The effect of this volume reduction will be exactly the same as if a certain amount of fluid is released from the actuator 101 thereby allowing the load plate 112 to move upwardly with the valve stem 102 following such movement. This could cause the shut-in valve to partially obstruct the flowline and reduce the free flow through the flow line which is, of course, undesirable.

The hydraulic actuator 101 of FIG. 5, accommodates this volume change in the hydraulic fluid by providing the disc spring 122 between the outside circumference of the connector 100 and the inside circumference of the cylinder 120. Retaining ring 121 is provided in the bottom of cylinder 120 and retains the disc spring 122 mounted in the circumferential cavity 114 between the retaining ring 121 and a shoulder 133 on the cylinder 120.

A circumferential cavity 124 is provided in the load plate 112. This cavity 124 is of a circumference such that it will accommodate the movement of the connector 100 into the cavity 124 and is of a depth such that the movement of the connector 100 caused by the volume changes of the fluid due to temperature will be accommodated as will be explained.

In operation and to open the flowline, fluid will be pumped into the inlet 130 of actuator 101, either manually or otherwise, and the load plate 112 together with cylinder 120, connector 100, indicator rod 104 and valve stem 102 will move downwardly against the force exerted by the compression of spring 131 until the connector 100 contacts the packing retainer 132 of the bonnet structure 113. At this point, the shut-in valve will be in its fully open position.

The pumping, however, is continued and the shoulder 123 of connector 100 further acts against disc spring 122 and compresses it as the cavity 124 of load plate 112 moves over the top of connector 100 until contact is made between the load plate 112 and the connector 100. This contact position defines the uppermost portion of the cavity 124 and further compresses the disc spring 122 between the shoulder 123 of the connector 100 and the shoulder 123 of the cylinder 120. In this position, the shut-in valve remains in its fully open position.

When the ambient temperature decreases, the volume of fluid within the actuator 101 will also decrease thereby reducing the pressure of the fluid on the load plate 112 and allowing upwards movement of the cylinder 120 relative to the connector 100 and valve stem 102 which remain in the fully open position. This relative movement will occur before any movement of the valve stem 102 with the cylinder 120. The amount of this movement which is caused by a known change in ambient temperature is easily calculated and will be accommodated by the design depth "S" of the cavity 124 in load plate 112. The valve stem 102 and connector 100 will not move upwardly until the connector 100 is fully out of the cavity 124 and collar 134 contacts load plate 112 in which event fluid is being released from the actuator 100 and valve shut down is intended.

Many modifications will readily occur to those skilled in the art to which the invention relates and the specific embodiments described should be taken as illustrative of the invention only and not as limiting its scope as defined in accordance with the accompanying claims.

What is claimed is:

1. A connector for an actuator assembly, said connector being removable from and axially adjustable relative to the valve stem of a shut-in valve, said connector having an inside diameter defining a first hole in the bottom of said connector for attachment to said valve stem, said connector further having an outside diameter, at least one (1) pin retaining slot extending radially and entirely through said connector between said bottom and the top of said connector, said pin retaining slot being transverse to the axis of said first hole and being operable to receive a pin extending through said valve stem and connector, said pin retaining slot having a circumferential width at said outside diameter of said connector which is greater than the width of said slot at said inside diameter, said slot having separated and opposed end surfaces allowing a predetermined rotation of said connector relative to said valve stem until said pin contacts said end surfaces when said connector and valve stem move axially under operation of said actuator assembly and an axially extending opposed hole in the top of said connector for connection within said actuator.

2. A connector as in claim 1 wherein said first hole of said connector is a threaded hole operable to be connected to said valve stem.

3. A connector as in claim 1 wherein said opposed hole of said connector is a threaded hole operable to be connected to a threaded member.

4. A connector as in claim 3 wherein said threaded member is a stud.

5. A connector as in claim 3 wherein said threaded member is an indicator rod.

6. A connector as in claim 1 and further comprising a lower stop on the bottom of said connector, said stop being operable to contact the upper portion of a bonnet structure when said connector is mounted on said valve stem.

7. A connector as in claim 6 and further comprising an upper stop on the top of said connector, said upper stop being operable to contact the diaphragm plate of said actuator.

8. A connector as in claim 1 wherein said actuator assembly is hydraulic.

9. A connector as in claim 1 wherein said connector is operably associated with a hydraulic actuator assembly, said actuator comprising a housing, a cylinder in said housing, a rod within said cylinder and being connected to a valve stem, a compression spring acting between said cylinder and said housing and a second spring acting between said cylinder and said valve stem, said second spring being a disc spring acting between said cylinder and said valve stem.

10. A connector as in claim 9 and further comprising a predetermined distance between said valve stem and a load plate operably connected to said cylinder, said load plate being movable axially relative to said valve stem and rod over said predetermined distance.

11. A connector as in claim 10 wherein said predetermined distance is defined by a cavity in the bottom of said load plate and a connector is attached between said valve stem and said rod, said connector being accommodated by said cavity.

12. A connector as in claim 11 wherein said rod is attached to said valve stem with a connector, the top of said connector being accommodated within said recess.

13. A connector as in claim 12 wherein the amount of movement of said load plate relative to said valve stem corresponds to a decrease of fluid volume in said actuator caused by ambient temperature changes.

14. A connector as in claim 1 wherein said actuator assembly is pneumatic.

15. A pneumatic actuator assembly comprising an actuator housing, means for connecting said actuator housing to the bonnet structure of a valve, a diaphragm movable within said actuator housing under the influence of pressurized gas and a compression spring, the position of said diaphragm extending between a first position under the influence of said pressurized gas closer to said bonnet structure and a second position under the influence of said compression spring further from said bonnet structure, said compression spring being mounted within said housing and acting in a direction opposed to the direction of said pressurized gas on said diaphragm, an indicator rod removably attached to a connector and extending through the top of said actuator housing, said connector having a bottom surface and being located below said diaphragm, said connector having an inside diameter defining a first hole, said hole being operable to be attached and removed from a valve stem extending through said bonnet structure, said connector further having an outside diameter, said connector being axially adjustable relative to said valve stem, said connector having a radial slot extending wholly through said connector from said inside diameter to said outside diameter, said slot having a width which is greater at said outside diameter of said connector than at said inside diameter, said slot having separated and opposed end surfaces and being operable to accommodate a pin extending though said valve stem and said connector and allowing a limited amount of radial play about said pin until said pin contacts said end surfaces, said radial play allowing for a predetermined rotation of said connector relative to said valve stem when said connector and valve stem move axially under operation in said actuator assembly.

16. A pneumatic actuator assembly as in claim 9 wherein said indicator rod is removably attached to said connector by way of a stud threadedly connected between said indicator rod and said connector.

17. A pneumatic actuator as in claim 16 wherein said axial adjustment of said connector relative to said valve stem is such that said pin is insertable through said connector and said stem when the bottom of said connector contacts a predetermined location on said bonnet structure of said valve.

18. A pneumatic actuator as in claim 17 wherein said predetermined location is the top of the packing retainer of said bonnet structure.

* * * * *